United States Patent [19]

Acree

[11] Patent Number: 5,099,514
[45] Date of Patent: Mar. 24, 1992

[54] MULTI-PURPOSE TELEPHONE ACCESSORY UNIT

[76] Inventor: Delores F. Acree, 1520-B Tramway Blvd. NE, Albuquerque, N. Mex. 87112

[21] Appl. No.: 433,994

[22] Filed: Nov. 9, 1989

[51] Int. Cl.$^5$ ............................................. H04M 1/00
[52] U.S. Cl. .................................. 379/441; 379/442; 379/430
[58] Field of Search ............... 379/441, 442, 443, 395, 379/387, 430, 110, 90; 381/25, 74; 455/344

[56] References Cited

U.S. PATENT DOCUMENTS

| | | | |
|---|---|---|---|
| 4,634,816 | 1/1987 | O'Malley et al. | 379/430 |
| 4,754,484 | 6/1988 | Larkin et al. | 379/430 |
| 4,782,524 | 11/1988 | McQuinn et al. | 379/387 |
| 4,790,002 | 12/1988 | D'Agosta, III et al. | 319/387 |
| 4,893,331 | 1/1990 | Horinch et al. | 379/430 |
| 4,930,156 | 5/1990 | Norris | 319/430 |

FOREIGN PATENT DOCUMENTS 0207250  8/1988  Japan .................................. 379/430

OTHER PUBLICATIONS

"Teleconnect", Jul. 1987.
"Telephony", Mar. 16, 1987.
"Inbound/Outbound", May 1988.

*Primary Examiner*—Jin F. Ng
*Assistant Examiner*—Jason Chan
*Attorney, Agent, or Firm*—Andsel Group, Inc.; Charles C. Logan, II; David L. Baker

[57] ABSTRACT

A multi-purpose telephone accessory unit for persons who use a telephone for extended periods of time. It is connected to a conventional telephone by removing the telephone cord from the normal handset and plugging it into the accessory unit. The unit wears a headset equipped with two independently controlled ear piece receivers and a mouth piece transmitter. An external wall plug type A.C./D.C. transformer is used to provide power for the unit. The unit has separate volume controls and separate equalizers for the respective ear piece receivers. A mute switch is connected into the voice transmission circuit to allow the user to speak with other persons in their area without the person on the other end of the telephone line hearing the conversation. An internal microphone is also provided that can be connected through the mute switch that allows the user to pick up voices and sounds in their immediate vicinity of the unit without the user having to remove the ear receiver unit.

6 Claims, 1 Drawing Sheet

MULTI-PURPOSE TELEPHONE ACCESSORY UNIT

BACKGROUND OF THE INVENTION

The invention relates to telephones and more specifically to an accessory unit that gives the user added versatility.

Presently various types of telephone accessory units exist and one of the main ones is the telephone answering machine. Very few accessory units have been designed so that the user may wear a headset having a mouth piece microphone attached thereto.

It is an object of the invention to provide a novel multi-purpose telephone accessory unit that can be used with conventional state of the art telephone sets having a normal handset.

It is another object of the invention to provide a novel multi-purpose telephone accessory unit that has a left and right equalizer unit in its circuit for its respective left and right headset ear pieces.

It is also an object of the invention to provide a novel multi-purpose telephone accessory unit that has a circuit which allows an auxiliary sound source such as a radio or audio cassette player to be mixed with the signal received from the telephone line and heard only by the user, not the party on the other end of the telephone line.

It is an additional object of the invention to provide a novel multi-purpose telephone accessory unit that would have a mute switch and circuitry including an internal microphone, which would allow the user to speak with other persons in their immediate area while the mute switch is actuated while not requiring them to remove the headset from their ears.

SUMMARY OF THE INVENTION

Applicant's novel multi-purpose telephone accessory unit is an enhancement device for persons who use a telephone for extended periods of time. It is connected to a conventional telephone set by removing the plugin jack from the handset and inserting this plugin jack into the telephone line handset jack receptacle of the novel accessory unit.

The user wears a headset equipped with two independently controlled ear piece receivers and a mouth piece transmitter. The headset plugs into the accessory unit. An external wall plug type AC/DC transformer also plugs into the accessory unit to provide power. Also, the user can attach an auxiliary sound source such as a radio or audio cassette player by inserting its jack into the auxiliary jack receptacle of the accessory unit. This auxiliary source is mixed with the signal received from the telephone line and it would be heard only by the user, not by the party on the other end of the telephone line.

The novel multi-purpose telephone accessory unit is restricted to telephone sets which do not have the dialing and signaling mechanism in the handset.

The multi-purpose telephone accessory unit also contains a right and left graphic equalizer, that enables the user to tailor the sound recieved at each ear by selectively boosting and/or attenuating the amplitude of five different frequency bands. Each frequency band and the overall volume for each side are independently adjustable by the user.

The accessory unit has four switch members. A first switch turns the power on and off for the unit. A second switch allows the user to reverse the signals to the ear pieces. A third switch selects three different mouth piece volumes and impedances for adaption to various types of telephone set transmitters and bridge circuits. The fourth switch has two sets of poles which enable the user to mute the telephone transmit path. The first set of poles enable the user to mute the telephone transmit path. The second set of poles disconnects the telephone receive path and connects an internal microphone circuit which picks up and reproduces any sounds in the immediate vicinity of the unit. As a result of activating the fourth switch, the user is able to conduct a conversation with persons next to them and not have the conversation transmitted to the other end of the telephone line. The internal microphone is a self contained microphone circuit within the unit itself. As mentioned previously, it allows the user to hold a conversation with persons in their immediate area without removing their headset.

The ear piece interface network terminates the receive path from the telephone set as would the receiver in the telephone handset. Additionally, this network divides the receive signal down to a level that is approximately equal to that of the internal microphone circuits output. This division creates a consistent average level of input into the preamplifier.

The preamplifier receives an input signal from either the earpiece interface network or the internal microphone circuit and accomplishes the first stage of amplification of the unit's receive path. The output of the preamplifier provides the telephone receive or microphone signal to one of the two summing inputs of the left and right summing amplifiers. The other summing inputs come from an auxiliary input source plugged into the auxiliary input receptacle. The left and right summing amplifiers mix together (sum) the signals from the auxiliary input jack and the preamplifier. This enables the user to privately listen to a secondary source of sound such as music. The auxiliary input path is fully binaural so that the left and right side separation of a stereo source is maintained.

The left and right equalizers segregate the signal output from the left and right summing amplifiers into five logrithmically spaced frequency bands: 100 HZ, 290 HZ, 100 HZ, 2900 HZ, 10,000 HZ. Each frequency band on both right and left sides has a separate control that enables the user to selectively boost or cut (up to approximately 9 dB for a total of 18 db adjustment range) that portion of the signal that is contained within that band. The frequency band sections are arranged in parallel to minimize the interaction of adjustments between adjacent frequency bands. As with the summing amplifiers, the left and right equalizers are independent to maintain full binaural control. This allows the user to individually tailor the pitch of the sound presented to each of their ears.

The output amplifiers receive the equalized signal from the equalizer output buffers, filter out the unwanted frequencies above the 10,000 HZ equalizer band and boosts the composite signal up to drive the user's earpieces through the headset jack. The output amplifiers, as with the summing amplifiers and equalizers maintain the full binaural path. This is also where the user is able to adjust the overall listening level of the composite signal; there is a separate control for each side.

The mouthpiece amplifier supplies bias current to and receives the voice signal from the headset mouthpiece through the headset jack. This signal is amplified and the resulting average level and impedance set, depending upon the position of the earpiece reverse switch, to interface with the telephone set transmit path through the telephone line handset jack receptacle. This circuit is also configured to provide the mute function.

The power supply receives primary power from an external wall plug type AC/DC transformer through AC/DC transformer jack receptacle. It converts this into three regulated voltage levels: +V, −V and a ground or center reference. These voltage levels are used to supply all the unit's circuitry described above. The power supply could also be received from an internal replacable battery. If this were the case, when the external AC/DC transformer is plugged into the jack, the internal battery would be disconnected.

DESCRIPTION OF THE PREFERRED EMBODIMENT

Figure 1:
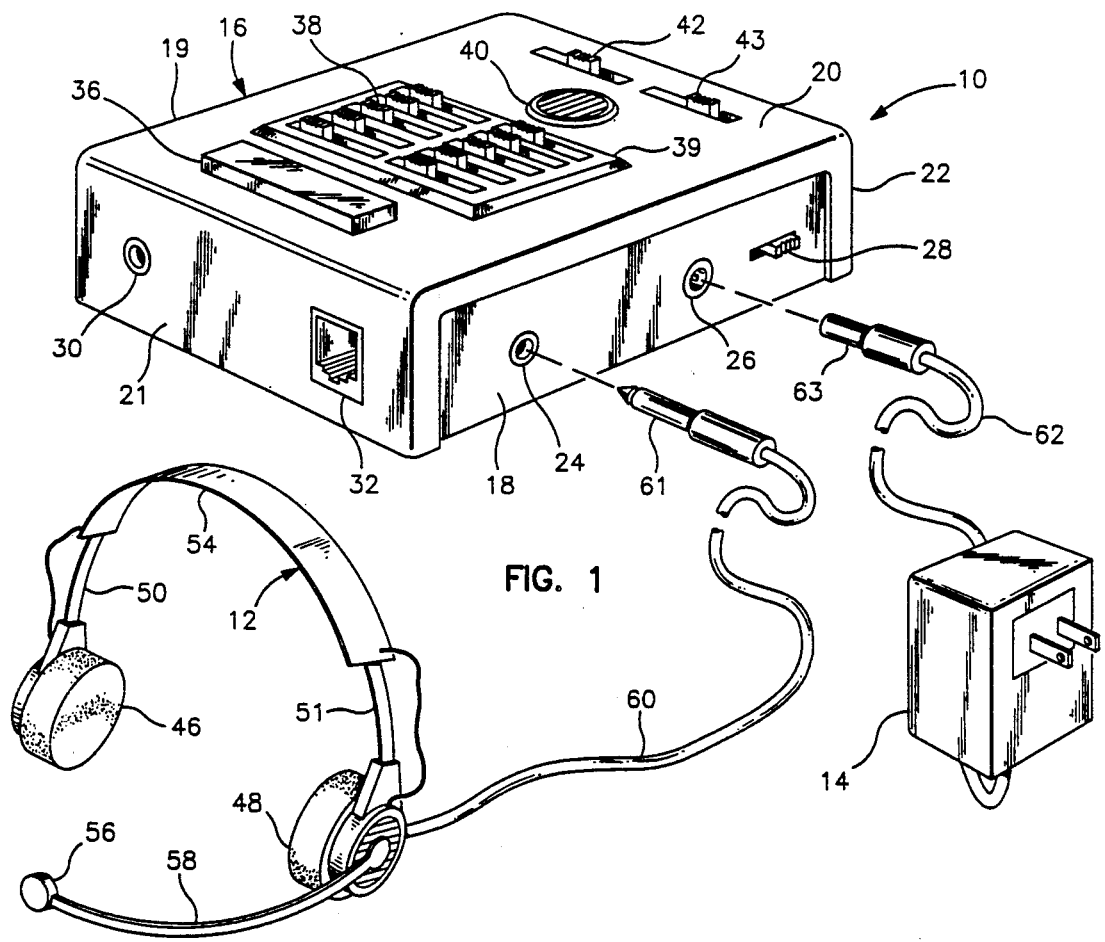
FIG. 1 is an exploded front perspective view of applicant's novel multi-purpose telephone accessory unit.

Applicant's novel multi-purpose telephone accessory unit will now be described by referring to FIGS. 1-2. The accessory unit is generally designated numeral 10.

Telephone accessory unit 10 has a headset unit 12, an AC/DC transformer 14, and a housing 16.

Housing 16 has a front wall 18, a rear wall 19, a top wall 20, a left side wall 21, and a right side wall 22. A headset jack receptacle 24 and an AC/DC transformer jack receptacle 26 are mounted in front wall 18. An ON/OFF switch 28 is also mounted in the front wall. An auxiliary audio input jack receptacle 30 and a telephone line handset jack receptacle 32 are mounted in left side wall 21. A mute switch 36 extends upwardly from top wall 20. The controls for the graphic equalizer 38 also extend through top wall 20. Internal microphone 40 is mounted in the top wall and the controls for the left output amplifier 42 and right output amplifier 43 extend through slots in top wall 20.

Headset unit 12 has a right earpiece receiver 46 and a left earpiece receiver 48. Their respective telescoping arms 50 and 51 are connected to head support member 54. A mouth piece microphone 56 is mounted on support arm 58. Electrical cable 60 connects headset unit 12 to headset plug 62. Electrical cable 61 is connected to AC/DC transformer plug 63.

Figure 2:
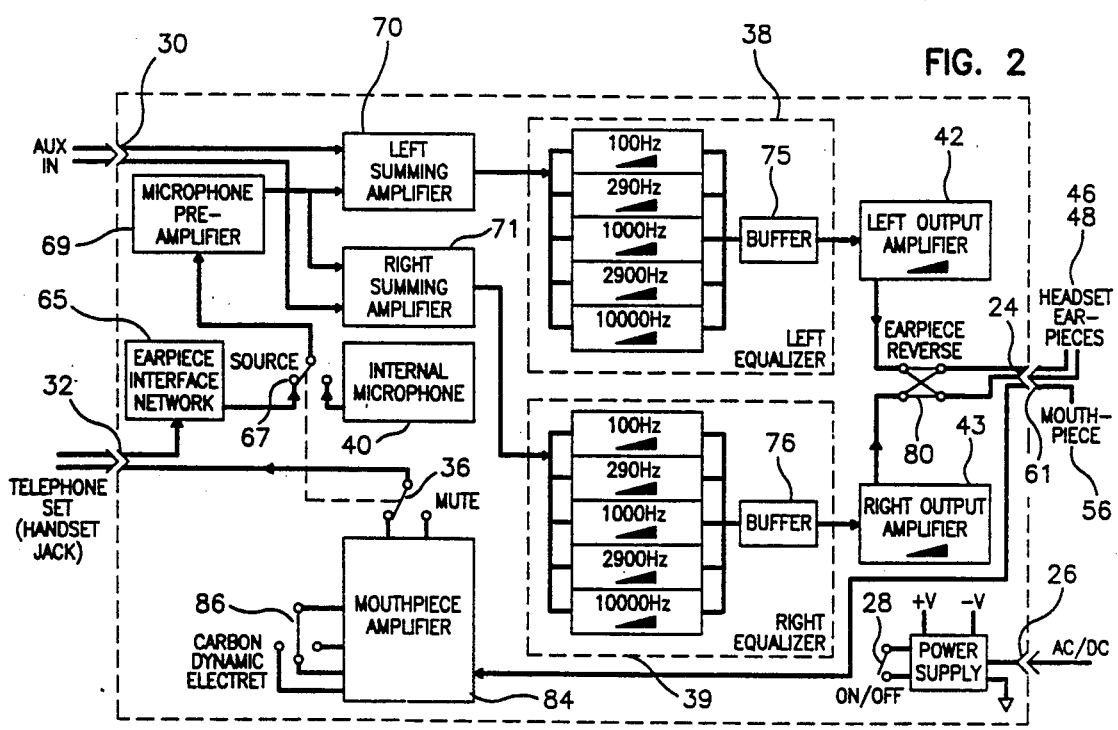
FIG. 2 is a schematic illustration of the components and circuit found in the interior of the housing of the telephone accessory unit.

The circuitry for accessory unit 10 is best understood by referring to FIG. 2. There it is noted that electrical signals from the telephone set enter telephone line handset jack receptacle 32. Next they pass through earpiece interface network circuit 65 through source switch 67 on its way to microphone preamplifier 69. The signal is then mixed with the auxilliary input, which enters the accessory unit through jack 30, and this composite signal flows through left summing amplifier 70 and right summing amplifier 71 on their way to the respective left and right equalizers 38 and 39. The signals passing through the equalizers pass through buffers 75 and 76 on their way to the respective left output amplifier 42 and right output amplifier 43. A reverse switch 80 allows the signals to the earpiece receivers 46 and 48 to be switched. The signals transmitted from mouth piece 56 pass through mouthpiece amplifier 84 and mute switch 36. Switch 86 is also connected to mouth piece amplifier 84 to match the type of microphone circuit in the telephone set.

What is claimed is:

1. A multi-purpose telephone accessory unit comprising:
   a housing having a top wall, a front wall, a rear wall, and left and right side walls;
   a handset telephone line jack receptacle mounted in one of the walls of said housing;
   a headset jack receptacle mounted in one of the walls of said housing;
   a headset unit having a left ear receiver and a right ear receiver, a mouthpiece microphone is also supportably connected to said headset unit, an electrical cable connecting said respective left and right ear receivers and said mouth piece microphone to the headset jack;
   a voice transmission electrical circuit in said housing connecting said handset telephone line jack receptacle to said headset jack receptacle;
   a voice receiver electrical circuit in said housing connecting said handset telephone line jack receptacle to said headset jack receptacle and having an earpiece interface network circuit; and
   an auxiliary input jack receptacle mounted in one of the walls of said housing and it is electrically connected to said voice receiver electrical circuit so that an auxiliary audio input source is mixed with the signal received from a telephone line and heard only by a user on one end of the telephone line to which said unit is connected, but not by the party on another end of the telephone line.

2. A multi-purpose telephone accessory unit as recited in claim 1 wherein said voice receiver electrical circuit further comprises means for separately adjusting the volume in said respective left and right ear receivers.

3. A multi-purpose telephone accessory unit as recited in claim 1 further comprising a switch in said voice receiver electrical circuit for reversing the sound to the respective left and right ear receivers.

4. A multi-purpose telephone accessory unit as recited in claim 1 further comprising a right and a left equalizer unit in said voice receiver electrical circuit.

5. A multi-purpose telephone accessory unit as recited in claim 1 further comprising a mute switch in said voice transmission circuit.

6. A multi-purpose telephone accessory unit as recited in claim 1 further comprising means for disconnecting the the earpiece interface network circuit and connecting an internal microphone circuit which picks up and reproduces any sound in the immediate vicinity of said accessory unit.

* * * * *